United States Patent Office 2,900,316
Patented Aug. 18, 1959

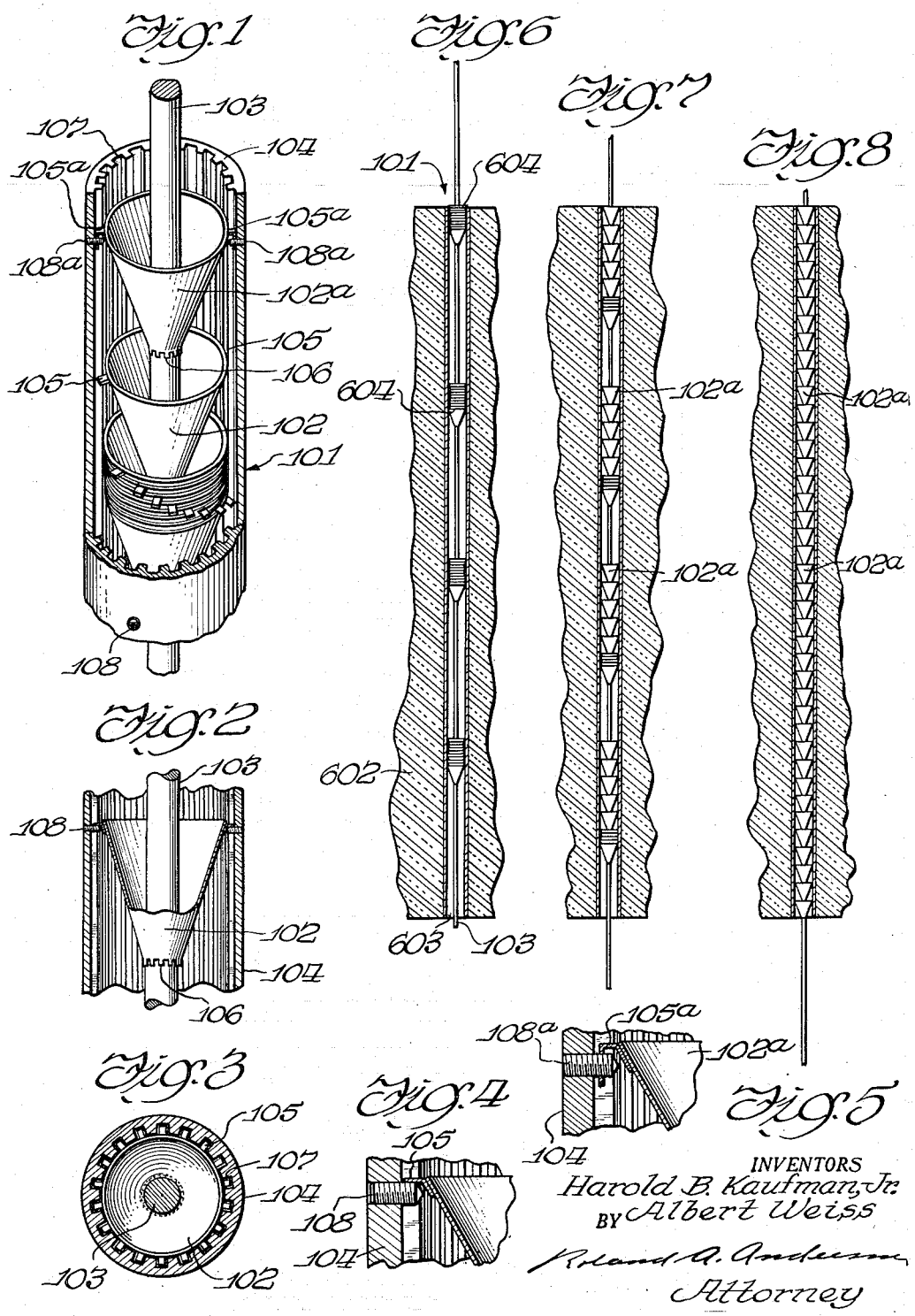

2,900,316

REACTOR CONTROL DEVICE

Harold B. Kaufman, Jr., New York, N.Y., and Albert Weiss, Whitehall Borough, Pa., assignors to the United States of America as represented by the United States Atomic Energy Commission Application October 17, 1955, Serial No. 541,108

5 Claims. (Cl. 204—193.2)

This invention relates in general to devices for controlling nuclear reactivity in neutronic reactors and in particular to control elements made of neutron-absorbing material adapted to effect reactivity in active portions of the reactors.

A neutronic reactor, as is well known in the nuclear art, is an apparatus comprising essentially an active portion containing thermal-neutron-fissionable fuel distributed in a moderator material and a plurality of control elements for controlling neutrons released from the fuel by incident thermal neutrons. Specific details of the theory and essential characteristics of various reactors are set forth in Patent 2,708,656 issued to Fermi and Szilard on May 17, 1955. In any of such neutronic reactors, the rate of the reaction is controlled by actuating devices, made of materials having high neutrol-absorbing characteristics, commonly referred to as "neutron cross-section," in the active portion of the reactor or in an area closely adjacent to said active portion. Materials such as boron or cadmium have high neutron-absorbing characteristics and are commonly used in the construction of such devices.

The usual method of controlling the reactivity of a neutronic reactor, as is known to those skilled in the art, is to insert or withdraw control elements in or out of the active portion of the reactor. This method of control has a disadvantage from the operational standpoint, in that it results in an uneven neutron-flux distribution in the active portion of the reactor, and a disadvantage from the mechanical standpoint, in that it requires that a particular spatial clearance be maintained around the neutronic reactor so that the control elements can be withdrawn from the confines of the reactor during operation. The use of more than one control element in the reactor introduces shadowing upon the other elements in the neutron flux existing in said reactor. As to the broad aspects of shadow control, reference may be had to the copending application of S. Untermyer et al., S.N. 459,219, filed on September 29, 1954, by the common assignee.

An object of this invention is to provide a method for controlling the reactivity in a neutronic reactor in a uniform manner over a wide range of control by translatably manipulating a series of control elements within the reactor to achieve various degrees of neutron shadowing over said elements.

Another object of the invention is to provide a device for controlling neutronic reactivity in the active portion of the reactor wherein said device is principally housed within the active portion of said reactor during the entire operation.

Another object of the invention is to provide a device for controlling neutronic reactivity in the active portion of the reactor, said device comprising a plurality of elements translatably movable with respect to each other, said elements being uniformly distributed throughout the active portion of the reactor to effect uniform control over neutron flux.

A further object of the invention is to provide a device for controlling neutronic reactivity in a reactor, said device comprising elements which remain entirely within the active portion of the reactor during the entire range of operation to thereby achieve uniform control over the neutron flux.

The foregoing, and other objects and advantages of the invention, will become apparent from a consideration of the specification and the accompanying drawings, wherein:

Fig. 1 is a perspective view partially broken away to show the internal structure of a control device constructed in accordance with the teachings of this invention;

Fig. 2 is a longitudinal sectional view of a portion of the control device;

Fig. 3 is a transverse sectional view of the control device;

Fig. 4 is a fragmentary sectional view showing the engagement of a movable element of the control device with a stop;

Fig. 5 is a fragmentary sectional view showing how a fixed element of the control device is held against movement; and Figs. 6, 7 and 8 are sectional views through a portion of a reactor, showing the disposition of the control device in various degrees of control.

In accordance with the teachings of this invention, there is provided a device for controlling neutronic reactivity in the active portion of a neutronic reactor whereby said device comprises a plurality of hollow nesting elements made of material having a high neutron absorption cross-section. Means are provided for uniformly distributing the elements throughout the entire length of the reactor to achieve a maximum and uniform control as well as for collecting the elements into compact bundles within the reactor to achieve minimum control. As a result, a substantially uniform control is exerted over neutron flux throughout the reactor by the elements which are confined entirely within the reactor during the entire control operation. Since the elements are adapted to be contained within each other during a portion of the control range, flux shadowing is produced and therefore effects the neutron absorption capabilities of the shadowed elements.

Referring to Fig. 1, a control device 101 comprises essentially a plurality of sets of elements 102 and 102a, a rod 103, and a guide tube 104. The elements 102 and 102a are hollow, nesting, truncated right cones. In each set there are a single element 102a which is fixed and appears uppermost in Figs. 6–8 and a number of elements 102 which appear below the fixed element 102a and are movable longitudinally of the guide tube 104. Each element 102 has a pair of diametrically opposed ears 105 attached to the larger end of the cone and a plurality of slotted fingers 106 at the small end of said cone adapted to engage frictionally the surface of the rod 103. Each element 102a carries a pair of diametrically opposed ears 105a. The guide tube 104 is essentially a hollow cylinder having a plurality of internal longitudinal grooves 107 which are adapted to engage the ears 105 and guide the elements 102 during the actuation of the rod 103. Each pair of diametrically opposed grooves 107 has at least one pair of stops 108 located within the grooves 107 and fastened therein for the purpose of limiting the movement in one direction of one of the elements 102 by means of their associated ears 105. As shown in Figs. 2 and 4, each ear 105 has two angularly related legs, one secured as by bonding, to the associated element 102, and the other engageable with the stop 108. Each stop 108 has threaded engagement with an opening in the wall of the tube 104.

As shown in Figs. 1 and 5, two stops 108a, which are secured in diametrically opposed grooves 107, secure each fixed element 102a against movement along the guide tube 104. Each ear 105a is generally in the shape of a U, one leg of which is secured, as by bonding, to the associated element 102a and the other receives the associated stop 108a in an opening. Each stop 108a has threaded engagement with an opening in the wall of the tube 104. The spatial distribution of the stops 108 within the tube 104 is helical so that each pair of stops occupies a different level with respect to the adjoining stops. If the rod 103 is moved in a particular direction to distribute the cones along its length, all the elements 102 will be moved a limited amount depending on the location of their respective stops.

The rod 103 and the guide tube 104 are made of materials having small neutron absorption cross-section characteristics, such as stainless steel, to present as little impedance as possible to the passage of neutrons therethrough. The elements 102, on the other hand, are made of material, such as cadmium, to block the passage of or absorb most of the incidental thermal neutrons. The elements 102 may be made entirely of neutron-absorbing material or may just have a coating or a plating of neutron-absorbing material deposited on a base of reinforcing metal. For example, a cadmium plate only about 20 mils thick is substantially opaque to thermal neutrons and additional thickness does not increase the effectiveness of the cadmium as a neutron absorber. In other words, the outer 20 mils of the element made of solid cadmium "hides" the remainder of the body and the remainder has substantially no effect as a neutron absorber.

The control device 101 described herein may be used in various neutronic reactors, homogeneous or heterogeneous. The control device 101 may be used specifically, for example, in the solid moderator type reactor that is described in the Fermi et al. patent. The control device 101 may be substituted for the control rod 32 disclosed in Fig. 7 of said Fermi et al. patent and used for controlling neutronic reactivity within said reactor.

As shown in Figs. 6, 7 and 8, the control device 101 extends vertically, and the guide tube 104 thereof is mounted in solid moderator 602 forming part of a neutronic reactor. It will be understood that the control device 101 could extend at some other angle than vertical and could be applied to a reactor having other than solid moderator. In Fig. 6, the control device 101 is shown in its least effective control position wherein the sets of elements 102 and 102a are nested together into a plurality of compact bundles 104. In this position, the control device 101 is capable of absorbing only those neutrons which are incident upon the bundles of the nested elements 102. The effectiveness of the control device 101 may be increased by withdrawing the bar 103 in a direction that appears as downward in Figs. 6-8. The position of the device 101 in Fig. 7 indicates an intermediate range of control wherein several of the elements 102 in each nest of bundles 604 have been distributed partially along the length of the reactor. The position of the device 101 in Fig. 8 shows a total distribution of the elements 102 throughout the guide tube 104 located in the reactor. In this condition, the control device 101 exerts a maximum control over neutron reactivity within the confines of the reactor. The maximum actuation of the control bar 103 distributes uniformly the elements 102 throughout the length of the reactor to thereby achieve uniform control over the neutron flux therein. In addition, as indicated in Figs. 6, 7 and 8, the active components of the control device 101, namely the absorbing elements 102 and 102a, are confined entirely within the reactor proper throughout the whole extent of the control operation. In the above figures, there are shown four nesting bundles of absorber elements 102 and 102a contained in the single control device 101. This illustration, however, is not intended to be a limitation of the broad aspects of the control device described herein. It is quite evident that a plurality of control devices 101 may be utilized in a reactor and that the arrangement of the number of nesting bundles in the control device 101 may be varied to any degree desired depending on the control requirements desired in the reactor. For example, if a minimum amount of actuation of the rod 101 is desired to achieve maximum control, it is evident that this can be accomplished by increasing the number of nesting bundles 604.

If it is desired to achieve maximum reactivity in the reactor, the rod 103 is moved axially in a direction that appears as upward in Figs. 6-8, thereby shifting the elements 102 in the same direction. The various fixed elements 102a limit the upward movement of the movable elements 102a and cause them to regroup in the bundles 604 shown in Fig. 6. In this position each fixed element 102a stops the next movable element 102, which in turn stops the next movable element 102, etc.

In addition to obtaining control over neutron flux in the active portion of the reactor, by uniform distribution of the elements 102 throughout the reactor, additional control is realized by manipulating a plurality of control devices 101 in a reactor in different manners to achieve mutual shadowing upon each other in the neutron flux in the reactor. This individual control over each control device 101 makes it possible to achieve a very flexible control in controlling neutron flux in the reactor.

While there has been described what is at present considered to be the preferred embodiment of the invention, it will be understood that various modifications may be made therein and it is intended in the appended claims to cover all such modifications as found within the true spirit and scope of the invention.

What is claimed is:

1. A device for controlling neutronic reactivity within the active portion of a neutronic reactor comprising a series of hollow neutron-absorbing elements, said elements having cavities therein to permit substantially a coextensive engagement therebetween, and a common longitudinal member for slidably supporting said elements, said member being effective in response to actuation to distribute the elements along its entire length throughout the reactor, whereby maximum control is exerted over neutron generation.

2. A device for controlling neutronic reactivity within the active portion of a neutronic reactor comprising a series of hollow neutron-absorbing elements arranged in groups, each element having a cavity for substantially housing an adjoining element, and a longitudinal member for commonly supporting said groups of elements, said member being effective in response to actuation to distribute the elements along its entire length whereby maximum control is achieved by a limited movement of the member.

3. A device for controlling neutronic reactivity within the active portion of a neutronic reactor comprising, a housing, a plurality of engaging elements made of material having high neutron-absorption cross-section, each element having inner surfaces defining a cavity adapted to engage interiorly with exterior surfaces of an adjoining element, and means for commonly supporting said elements in a stacked relation within the housing coaxially thereto, said supporting means being effective in response to actuation to disengage the elements and distribute same throughout the housing whereby maximum control is achieved by total disengagement of said elements.

4. A device for controlling neutronic reactivity within an active portion of a neutronic reactor, comprising a rod, a plurality of neutron-absorbing hollow elements slidably engaging the rod and being adapted to nest within each other, a pair of diametrically disposed ears extending outwardly from each element, a guide tube housing said elements and having a plurality of internal longitudinal grooves engaging said ears, and a plurality of pairs of stops positioned within the tube in pairs, the stops of each pair being disposed in diametrically opposed grooves and adapted to engage the ears of a particular element, one of said elements being permanently secured within the tube by its associated stops, said pairs of stops being arranged helically within the tube, whereby lengthwise movement of the rod will distribute by friction the unsecured elements along the length of said rod, the movement of each element being limited by its associated pair of stops.

5. A device for controlling neutronic reactivity within an active portion of a neutronic reactor, comprising a tube having longitudinal internal grooves, a rod, a group of hollow nesting neutron-absorbing cones slidably engaging the rod, a pair of diametrically opposed ears on each cone engaging individually a pair of grooves, a pair of stops disposed within each pair of opposing grooves and adapted to engage the projections of a particular cone at a predetermined level, and means for permanently fastening one of said cones, whereby the actuation of the rod results in a distribution of the cones along the length of the rod, each of the cones occupying a particular position as determined by its associated stops.

References Cited in the file of this patent

UNITED STATES PATENTS

| 2,725,993 | Smith | Dec. 6, 1955 |
| 2,768,134 | Fermi et al. | Oct. 23, 1956 |

OTHER REFERENCES

TID–7001, U.S. Atomic Energy Commission, Materials Testing Reactor Project Handbook, edited by John H. Buck, Carl F. Leyse, May 7, 1951, pp. 53–59.

Principles of Nuclear Reactor Engineering, by Samuel Glasstone, D. Van Nostrand Co., New York, July 1955, pp. 330–331.

Nucleonics, vol. 13, No. 8, August 1955, pages 30–33.